United States Patent
Saxstetter et al.

(10) Patent No.: US 9,791,026 B2
(45) Date of Patent: Oct. 17, 2017

(54) SPINDLE DRIVE FOR THE MOTORIZED ADJUSTMENT OF AN ADJUSTING ELEMENT OF A MOTOR VEHICLE

(71) Applicant: Brose Fahrzeugteile GmbH & Co. KG, Hallstadt, Hallstadt (DE)

(72) Inventors: Christian Saxstetter, Doerfles-Esbach (DE); Alwin Macht, Ebensfeld (DE); Andreas Diemar, Coburg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/347,876

(22) PCT Filed: Sep. 28, 2012

(86) PCT No.: PCT/EP2012/004084
§ 371 (c)(1),
(2) Date: Mar. 27, 2014

(87) PCT Pub. No.: WO2013/045104
PCT Pub. Date: Apr. 4, 2013

(65) Prior Publication Data
US 2014/0230586 A1  Aug. 21, 2014

(30) Foreign Application Priority Data
Sep. 28, 2011 (DE) .................. 20 2011 106 149

(51) Int. Cl.
*F16H 25/24* (2006.01)
*F16H 55/08* (2006.01)
(Continued)

(52) U.S. Cl.
CPC ........... *F16H 25/24* (2013.01); *E05F 15/622* (2015.01); *F16H 1/28* (2013.01); *F16H 55/0806* (2013.01);
(Continued)

(58) Field of Classification Search
CPC .. B60J 5/101; F16H 25/24; F16H 1/28; F16H 55/0806; Y10T 74/18576; E05Y 2201/72; E05Y 2900/546; E05F 15/622
(Continued)

(56) References Cited

U.S. PATENT DOCUMENTS 8,157,691 B2    4/2012  Stanovskoy et al.
8,585,124 B2 *  11/2013 Oberle et al. ............... 296/146.8
(Continued)

FOREIGN PATENT DOCUMENTS

| WO | 2020060146 U | 3/2008 |
| WO | 2008079011 | 7/2008 |
| WO | WO 2011006774 A1 * | 1/2011 |

OTHER PUBLICATIONS

PCT International Search Report and Written Opinion from International Application No. PCT/EP2012/004084, corresponding to U.S. Appl. No. 14/347,876, mailed Jan. 14, 2013, 9 pages.

*Primary Examiner* — Glenn Dayoan
*Assistant Examiner* — Melissa A Black
(74) *Attorney, Agent, or Firm* — Pauly, Devries, Smith & Deffner, LLC (57) ABSTRACT

The invention concerns a spindle drive for the motorized adjustment of an adjusting element of a vehicle, comprising a drive motor with a motor shaft, a speed reduction gear mechanism, and a feed gear mechanism, the speed reduction gear mechanism having a planetary gear mechanism and the feed gear mechanism being designed as a spindle/spindle nut gear mechanism, the planetary gear mechanism having a rotatable sun gear and coaxially in relation thereto a rotatable planet-gear carrier and a fixed or fixable ring gear, and the planet-gear carrier carrying at least one rotatable planet gear, which is in axially parallel engagement with the sun gear on the one hand and the ring gear on the other hand, the drive motor, the speed reduction gear mechanism and the
(Continued)

feed gear mechanism being accommodated one behind the other in a substantially elongate drive housing and aligned with a common longitudinal drive axis.

32 Claims, 8 Drawing Sheets (51) Int. Cl.
*F16H 1/28* (2006.01)
*E05F 15/622* (2015.01)

(52) U.S. Cl.
CPC ..... *E05Y 2201/72* (2013.01); *E05Y 2900/546* (2013.01); *Y10T 74/18576* (2015.01)

(58) Field of Classification Search
USPC ..................................... 74/89.23; 296/146.8
See application file for complete search history.

(56) References Cited

U.S. PATENT DOCUMENTS

| | | | |
|---|---|---|---|
| 2008/0060463 A1* | 3/2008 | Bochen et al. | 74/424.76 |
| 2009/0062058 A1* | 3/2009 | Kimes | F16H 1/28 475/344 |
| 2013/0269305 A1* | 10/2013 | Wang | A01D 34/00 56/14.7 |

* cited by examiner

SPINDLE DRIVE FOR THE MOTORIZED ADJUSTMENT OF AN ADJUSTING ELEMENT OF A MOTOR VEHICLE

CROSS-REFERENCE TO RELATED APPLICATIONS

This application is a national stage application under 35 U.S.C. 371 of International Patent Application Serial No. PCT/EP2012/004084, entitled "Spindelantieb zur motorischen Verstellung eines Verstellelements eines Kraftfahrzeugs," filed Sep. 28, 2012, which claims priority from German Patent Application No. DE 20 2011 106 149.7, filed Sep. 28, 2011, the disclosures of which are incorporated herein by reference.

FIELD OF THE INVENTION

The invention concerns a spindle drive for the motorized adjustment of an adjusting element of a motor vehicle.

BACKGROUND

The spindle drive in question can be used for all possible adjusting elements of a motor vehicle. Examples of this are a tailgate, a trunk lid, a door, in particular a side door, an engine hood or the like of a motor vehicle.

The known spindle drive (DE 20 2006 014 694 U1), on which the invention is based, is equipped with a rotary drive motor, a speed reduction gear mechanism arranged downstream of the drive motor and a spindle/spindle nut gear mechanism arranged downstream of the speed reduction gear mechanism. All of these components are accommodated one behind the other in an elongate, telescopic drive housing and are aligned with a common longitudinal drive axis.

The speed reduction gear mechanism of the known spindle drive comprises two planetary gear mechanism stages, which respectively have the usual components of a sun gear, planet-gear carrier with planet gears and a ring gear.

While the known spindle drive has a high degree of compactness with respect to the longitudinal drive axis in the radial extent, there are still possibilities for optimizing the achievable compactness in the extent along the longitudinal drive axis.

The invention addresses the problem of designing and developing the known spindle drive in such a way that the necessary installation space in the direction of the longitudinal drive axis is reduced.

SUMMARY

The key concept is that the engagement between the sun gear and the at least one planet gear of the planet-gear carrier is designed as an evoloid gearing.

Evoloid gearings are helical involute gearings that use pinion teeth in numbers down to just one to realize great transmission ratios in one stage with parallel axes. These evoloid gearings are known as such from the prior art ("Zahnradtechnik, Evolventen-Sonderverzahnungen zur Getriebeverbesserung" [Gear technology, special involute gearings for improving gear mechanisms], Dr-Ing. Karlheinz Roth, Springer-Verlag Berlin Heidelberg, 1998, ISBN 3-540-642 36-6, Chapter 1 "Evoloid-Verzahnungen . . . " [Evoloid gearings], page 2 et seq.). For the technical details of such an evoloid gearing, reference is made to this publication.

Specifically, the sun gear of the planetary gear mechanism is an evoloid gear wheel, the number of pinion teeth of which can be reduced to 1. Then, a single pinion tooth with an involute profile runs spirally around the sun gear axis.

A fundamentally interesting fact about an evoloid gearing is that, with the small number of pinion teeth, a high degree of compactness is achieved with regard to the radial extent, at the same time as a great speed reduction. This is possible by a special gearing geometry, which is explained in the publication cited above.

The use of an evoloid gearing for the engagement between the sun gear and the at least one planet gear makes a particularly high degree of compactness possible in the direction of the longitudinal drive axis, since it is often possible to dispense with the use of multiple planetary gear mechanism stages. This compactness in the direction of the longitudinal drive axis is of particular significance in the case of the spindle drive in question, to allow the available longitudinal extent of the spindle drive to be used as much as possible for producing the linear drive movement by means of the feed gear mechanism.

The compactness is further increased in the case of the proposed spindle drive by the sun gear on the one hand and the planet-gear carrier on the other hand being of a rotatable design and the ring gear being of a fixed or fixable design. In the simplest case, the ring gear is then a component part of a housing or the like.

With the proposed evoloid gearing, speed reductions can be established in a wide range for the speed reduction gear mechanism. In the case of an embodiment, a speed reduction is provided in a range between approximately 17:1 and approximately 19:1, which has proven successful in particular when the spindle drive is used as a tailgate drive. In this application area, a speed reduction of between approximately 14:1 and approximately 17:1, in particular of approximately 16:1, has also been found to be advantageous.

With suitable design, it is then quite possible according to an embodiment that the speed reduction gear mechanism is of a single-stage design and provides the single gear mechanism stage between the drive motor and the spindle/spindle nut gear mechanism, which contributes decisively to the aforementioned compactness in the direction of the longitudinal drive axis.

In the case of an embodiment, the speed reduction gear mechanism is of a non-self-locking design. This also plays a particular role in the use of the spindle drive as a tailgate drive, in order to make the manual adjustability of the tailgate possible. An evoloid gearing can surprisingly be readily designed as non-self-locking.

In some embodiments, an axial bearing arrangement is provided for the planet-gear carrier. The reason for this is that the transmission of drive torques via the evoloid gearing always entails the production of axial forces. Allowance is made for this by the use of a corresponding axial bearing arrangement, in order to reduce frictional losses and in particular ensure the return drivability of the speed reduction gear mechanism. The last-mentioned aspect is in turn of particular significance for the use of the spindle drive as a tailgate drive.

The aspect of the axial mounting is relevant not only to the planet-gear carrier but also to the sun gear. Correspondingly, in the case of an embodiment, a corresponding axial bearing arrangement is provided for the sun gear.

In some embodiments, the resultant axial forces acting from the planet gears onto the sun gear can be reduced or even eliminated entirely. The basic concept is to design the sun gear, planet gears and ring gear in such a way that the resultant axial forces acting from the planet gears onto the sun gear can be eliminated as mentioned above. For this, the sun gear according to an embodiment is equipped with two axial sun gear portions, the planet-gear carrier according to an embodiment is equipped with at least one planet gear of the first type and at least one planet gear of the second type and the ring gear according to an embodiment is equipped with a first ring gear portion and a second ring gear portion.

According to an embodiment, the effect can be achieved that, during operation under load, the at least one planet gear of the first type and the at least one planet gear of the second type exert opposing axial forces on the sun gear. The possibility of eliminating a resultant axial force effect on the sun gear allows the efficiency of the planetary gear mechanism to be increased.

In an embodiment, a balanced force distribution can be realized, and in particular operation with little vibration.

According to an embodiment, an adjusting element arrangement of a motor vehicle with an adjusting element and a spindle drive as proposed above is claimed. In this respect, reference may be made to all of the statements made in relation to the proposed spindle drive.

In an embodiment, the invention provides a spindle drive for the motorized adjustment of an adjusting element of a motor vehicle, comprising a drive motor with a motor shaft, a speed reduction gear mechanism, arranged downstream of the drive motor, and a feed gear mechanism, arranged downstream of the speed reduction gear mechanism, the speed reduction gear mechanism having a planetary gear mechanism and the feed gear mechanism being designed as a spindle/spindle nut gear mechanism, the planetary gear mechanism having a rotatable sun gear and coaxially in relation thereto a rotatable planet-gear carrier and a fixed or fixable ring gear, and the planet-gear carrier carrying at least one rotatable planet gear, which is in axially parallel engagement with the sun gear on the one hand and the ring gear on the other hand, the drive motor, the speed reduction gear mechanism and the feed gear mechanism being accommodated one behind the other in a substantially elongate drive housing and aligned with a common longitudinal drive axis, wherein the engagement between the sun gear and the at least one planet gear of the planet-gear carrier is designed as an evoloid gearing.

In an embodiment, the sun gear forms the driving end and the planet-gear carrier forms the driven end of the planetary gear mechanism.

In an embodiment, the planetary gear mechanism provides a speed reduction which lies in a range between approximately 17:1 and approximately 19:1, such as approximately 18.4:1, or in that the planetary gear mechanism provides a speed reduction which lies in a range between approximately 14:1 and 17:1, such as at approximately 16:1.

In an embodiment, the speed reduction gear mechanism is of a single-stage design and provides the single gear mechanism stage between the drive motor and the feed gear mechanism.

In an embodiment, the sun gear is designed as an evoloid gear wheel with a number of pinion teeth=1 or in that the sun gear is designed as an evoloid gear wheel with a number of pinion teeth=2 or in that the sun gear is designed as an evoloid gear wheel with a number of pinion teeth=3.

In an embodiment, the at least one planet gear assigned to the planet-gear carrier is designed as a helical-toothed cylindrical gear.

In an embodiment, the ring gear has for the engagement with the at least one planet gear assigned to the planet-gear carrier a helical internal toothing.

In an embodiment, the diameter of the at least one planet gear is greater than the diameter of the sun gear by a factor that lies in a range between approximately 2 and approximately 4, such as at approximately 3.

In an embodiment, two planet gears are provided, arranged when considered in a cross section taken transversely in relation to the longitudinal drive axis on opposite sides of the sun gear.

In an embodiment, more than two planet gears, such as four planet gears, which are at least partly arranged offset, such as in pairs, with respect to the longitudinal drive axis, are provided.

In an embodiment, the speed reduction gear mechanism, such as the drive train comprising the drive motor, the speed reduction gear mechanism and the feed gear mechanism, is of a non-self-locking design.

In an embodiment, an axial bearing arrangement is provided for the planet-gear carrier, such as the axial bearing arrangement has at least one axial bearing designed as a rolling bearing, such as a cylindrical roller bearing, needle bearing or ball bearing.

In an embodiment, an axial bearing arrangement is provided for the planet-gear carrier, bearing the planet-gear carrier in both axial directions, such as the bearing friction is different in opposing axial loading directions under axial loading of an identical amount, such as the bearing friction in one axial direction is more than 10% over the bearing friction in the other axial direction.

In an embodiment, the axial bearing arrangement for the planet-gear carrier provides an axial bearing designed as a rolling bearing in one axial direction and provides an axial bearing designed as a sliding bearing in the other axial direction.

In an embodiment, the planet-gear carrier has a substantially cylindrical carrier structure for the at least one planet gear, which is aligned with the longitudinal drive axis, such as the substantially cylindrical carrier structure of the planet-gear carrier has at least one cylinder end face, which can be in surface-area engagement with an axial bearing of the axial bearing arrangement.

In an embodiment, an axial bearing arrangement is provided for the sun gear, such as the axial bearing arrangement has at least one axial bearing designed as a rolling bearing, such as a cylindrical roller bearing, needle bearing or ball bearing.

In an embodiment, an axial bearing arrangement is provided for the sun gear, bearing the sun gear in both axial directions, such as the bearing friction is different in opposing axial loading directions under axial loading of an identical amount, such as the bearing friction in one axial direction is more than 10% over the bearing friction in the other axial direction.

In an embodiment, axial bearing arrangement for the sun gear provides an axial bearing designed as a rolling bearing in one axial direction and provides an axial bearing designed as a sliding bearing in the other axial direction.

In an embodiment, the speed reduction gear mechanism is assigned a gear housing, which can be mounted on the drive motor in the course of a preassembly.

In an embodiment, the sun gear has a first sun gear portion and a second sun gear portion, such as the two sun gear portions are arranged axially one behind the other, such as directly axially one behind the other, such as the two sun gear portions are connected to one another in one piece.

In an embodiment, the two sun gear portions have opposing flank directions.

In an embodiment, the planet-gear carrier has at least one planet gear of the first type and at least one planet gear of the second type.

In an embodiment, the at least one planet gear of the first type and the at least one planet gear of the second type have opposing flank directions.

In an embodiment, the planet-gear carrier has a first planet-gear carrier portion, for receiving the at least one planet gear of the first type, and a second planet-gear carrier portion, for receiving the at least one planet gear of the second type, such as the first planet-gear carrier portion and the second planet-gear carrier portion are arranged axially one behind the other, such as directly one behind the other.

In an embodiment, the ring gear has a first ring gear portion and a second ring gear portion, such as the two ring gear portions are arranged axially one behind the other, such as directly axially one behind the other.

In an embodiment, the first ring gear portion and the second ring gear portion have opposing flank directions.

In an embodiment, the first ring gear portion and the second ring gear portion are designed as separate components, such as separately mountable components.

In an embodiment, the at least one planet gear of the first type is in axially parallel engagement with the first sun gear portion on the one hand and the first ring gear portion on the other hand and in that the at least one planet gear of the second type is in axially parallel engagement with the second sun gear portion on the one hand and the second ring gear portion on the other hand.

In an embodiment, during operation under load, the at least one planet gear of the first type and the at least one planet gear of the second type exert axial forces, such as forces of the same amount, on the sun gear in opposing axial directions, and/or in that the at least one planet gear of the first type and the at least one planet gear of the second type always rotate in the same direction during the driving of the sun gear.

In an embodiment, two planet gears of the first type are provided, arranged when considered in a cross section taken transversely in relation to the longitudinal drive axis on opposite sides of the sun gear, and/or in that two planet gears of the second type are provided, arranged when considered in a cross section taken transversely in relation to the longitudinal drive axis on opposite sides of the sun gear, such as when considered in a cross section taken transversely in relation to the longitudinal drive axis the planet gear axes of the planet gears of the first type lie in a first plane and the planet gear axes of the planet gears of the second type lie in a second plane, which is aligned perpendicularly to the first plane.

In an embodiment, an adjusting element arrangement of a motor vehicle with an adjusting element and a spindle drive for the motorized adjustment of the adjusting element as described herein.

In an embodiment, the adjusting element is a tailgate, a trunk lid, a door, such as a side door, an engine hood or the like, of a motor vehicle.

BRIEF DESCRIPTION OF THE FIGURES

The invention is explained in more detail below on the basis of a drawing, which merely represents an exemplary embodiment and in which.

DETAILED DESCRIPTION

The spindle drive represented in the drawing serves for the motorized adjustment of an adjusting element 1 of a motor vehicle that is designed as a tailgate. This should be understood as advantageous, but not restrictive. Rather, the proposed spindle drive can be used for all possible adjusting elements of a motor vehicle, as still to be explained further below.

The spindle drive is equipped with a drive motor 2 with a motor shaft 3, a speed reduction gear mechanism 4, arranged downstream of the drive motor 2, and a feed gear mechanism 5, arranged downstream of the speed reduction gear mechanism 4, for producing linear drive movements. The speed reduction gear mechanism 4 has a planetary gear mechanism 4a, while the feed gear mechanism 5 is designed as a spindle/spindle nut gear mechanism for producing the linear drive movements.

The planetary gear mechanism 4a has in the usual way a sun gear 6 that is rotatable about a sun gear axis 6a. Provided coaxially in relation thereto is a planet-gear carrier 7, which is rotatable about a planet-gear carrier axis 7a and carries at least one planet gear 8, 9 that is rotatable about a planet gear axis 8a, 9a. In an embodiment, the planet-gear carrier 7 is correspondingly equipped with precisely two planet gears 8, 9. In principle, here too, just one planet gear or more than two planet gears may also be provided. Provided coaxially in relation to the sun gear 6 there is also a ring gear 10, which is aligned with a ring gear axis 10a and here is arranged such that it is fixed to the housing. It is also conceivable that the ring gear 10 is fixable, so that, depending on the state, it is fixed or freely rotatable about the ring gear axis 10a. In this case, the planetary gear mechanism 4a can be used as a switchable coupling.

The planet gears 8, 9 are in axially parallel engagement with the sun gear 6 on the one hand and with the ring gear 10 on the other hand. The term "axially parallel" means here that the sun gear axis 6a, the planet gear axes 8a, 9a and the ring gear axis 10a are aligned parallel to one another. The basic construction of the speed reduction gear mechanism 4 can be seen best by viewing FIGS. 3 and 4 together.

The feed gear mechanism 5, designed as a spindle/spindle nut gear mechanism, has a drive spindle 11, which meshes with a spindle nut 12. This can be seen from the representation according to FIG. 2. In an embodiment, the drive spindle 11 is driven by means of the drive motor 2. In principle, however, it is also possible that the spindle nut 12 can be driven by means of the drive motor 2.

A particularly slender form of construction is obtained by the drive motor 2, the speed reduction gear mechanism 4 and the feed gear mechanism 5 being accommodated one behind the other in a substantially elongate drive housing 13 and aligned with a common longitudinal drive axis 14. This alignment is obtained specifically by the motor shaft 3, the sun gear axis 6a, the planet-gear carrier axis 7a, the ring gear axis 10a and the drive spindle axis 11a being aligned with the longitudinal drive axis 14.

The important point is thus that the engagement between the sun gear 6 and the at least one planet gear 8, 9 of the planet-gear carrier 7 is designed as an evoloid gearing. The advantages this involves have been explained in the general part of the description.

With the aim of a high reduction ratio, it is provided here that the sun gear 6 forms the driving end and the planet-gear carrier 7 forms the driven end of the speed reduction gear mechanism 4.

As indicated above, with the evoloid gearing between the sun gear 6 and the planet-gear carrier 7, high speed reduction ratios can be realized. In an embodiment, the reduction ratio lies in a range between approximately 17:1 and approximately 19:1, which has proven successful in particular when the spindle drive is used as a tailgate drive. In tests, the reduction ratio of approximately 18.4:1 has proven to be particularly successful.

The fact that the speed reduction gear mechanism 4 can provide the aforementioned high reduction ratios means that the speed reduction gear transmission 4 can be of a single-stage design. In an embodiment, the speed reduction gear mechanism 4, in particular the planetary gear mechanism 4a, provides the only gear mechanism stage between the drive motor 2 and the feed gear mechanism 5, which allows a compact type of design with regard to the axial extent of the speed reduction gear mechanism 4.

Figure 5:
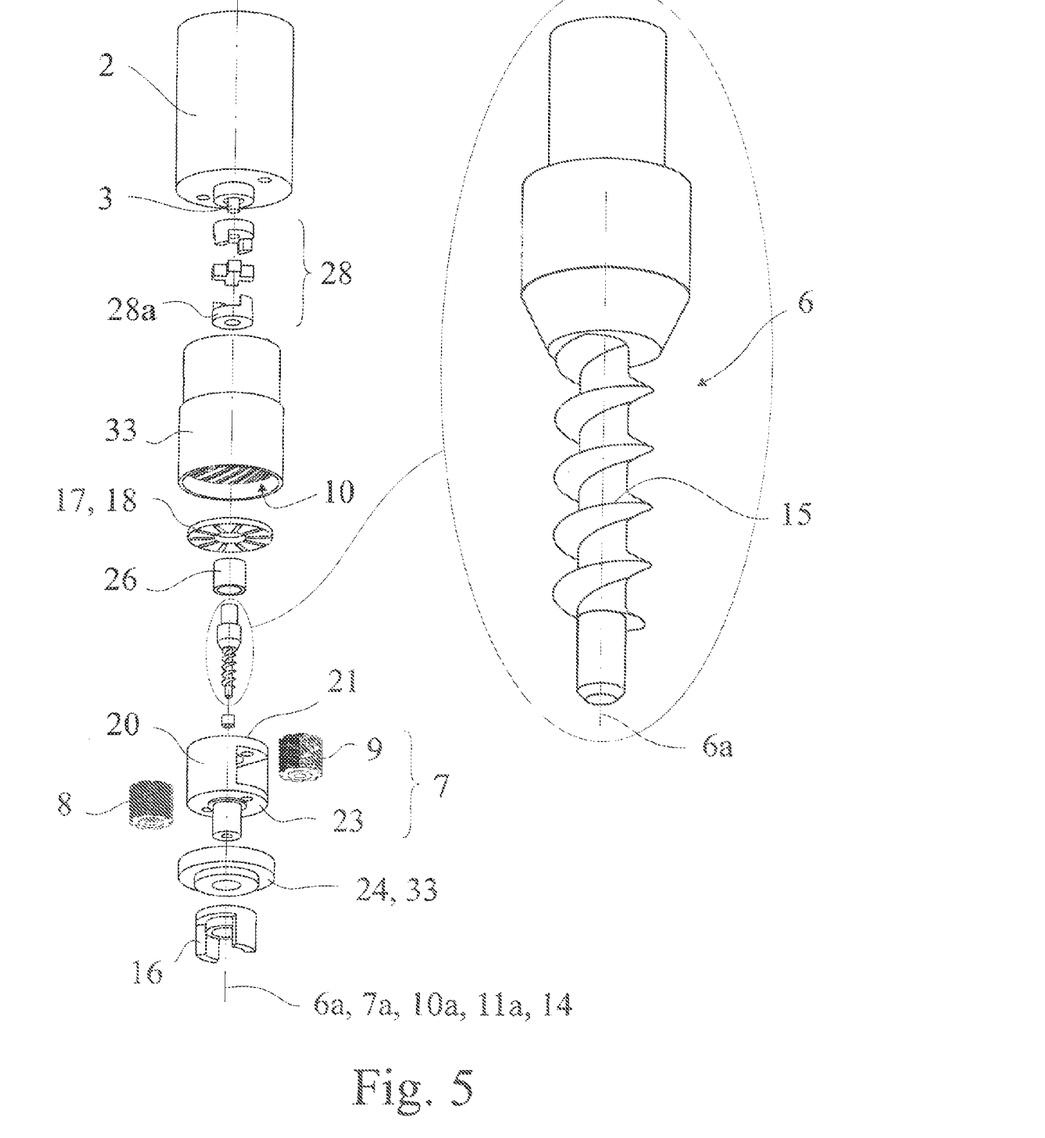
FIG. 5 shows the arrangement according to FIG. 3 in an exploded representation.

The representation of a detail in FIG. 5 shows that the sun gear 6 is designed as an evoloid gear wheel with a number of pinion teeth=1. In this case, the one pinion tooth 15 runs substantially spirally around the sun gear axis 6a. The axial extent of the sun gear 6 corresponds to approximately four turns of the pinion tooth 15.

Alternatively, it is also conceivable that the sun gear 6 is designed as an evoloid gear wheel with a number of pinion teeth=2 or with a number of pinion teeth=3. This may be advantageous in particular with regard to the likely generation of noise.

The planet gears 8, 9 of the planet-gear carrier 7 can be helical-toothed cylindrical gears. It is correspondingly the case here that the ring gear 10 has for the engagement with the planet gears 8, 9 a helical internal toothing. The design of the helical-toothed planet gears 8, 9 can be seen by viewing FIGS. 4 and 5 together.

Figure 3:
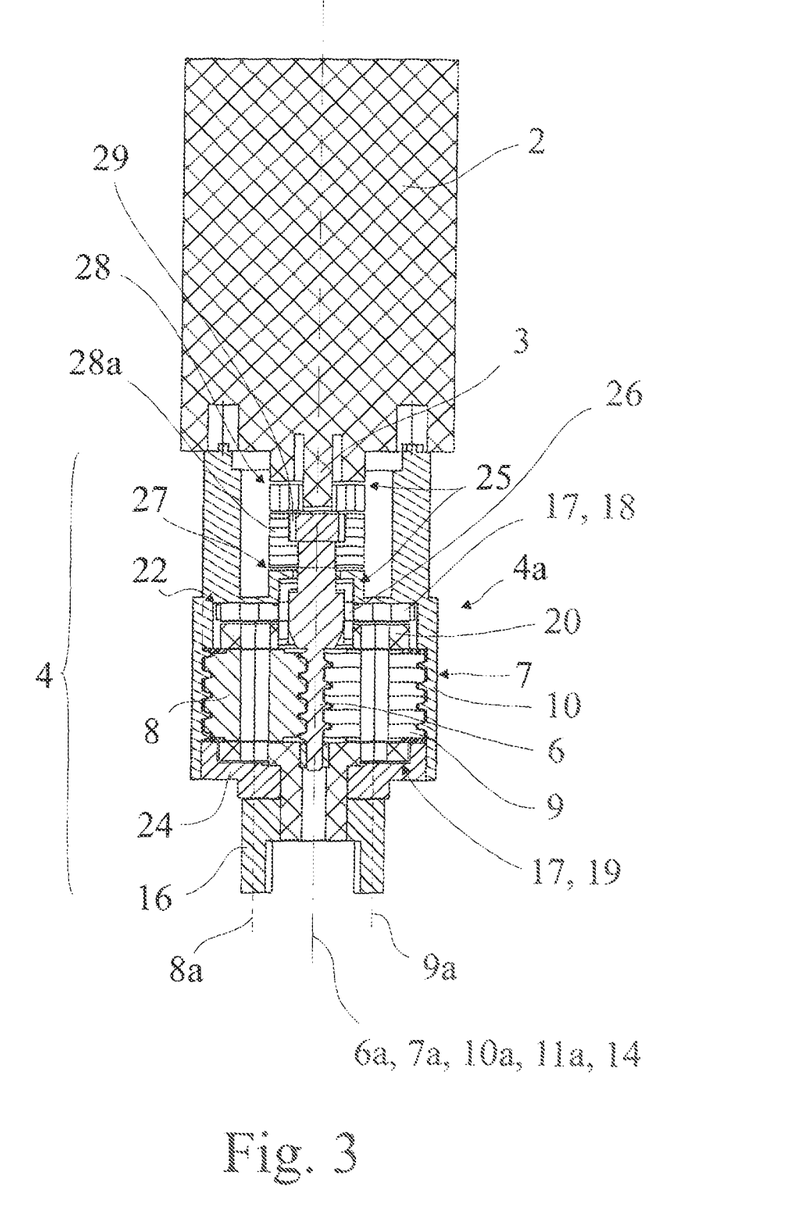
FIG. 3 shows the drive motor with a downstream speed reduction gear mechanism of the spindle drive according to FIG. 2 in a longitudinal section.
Figure 4:
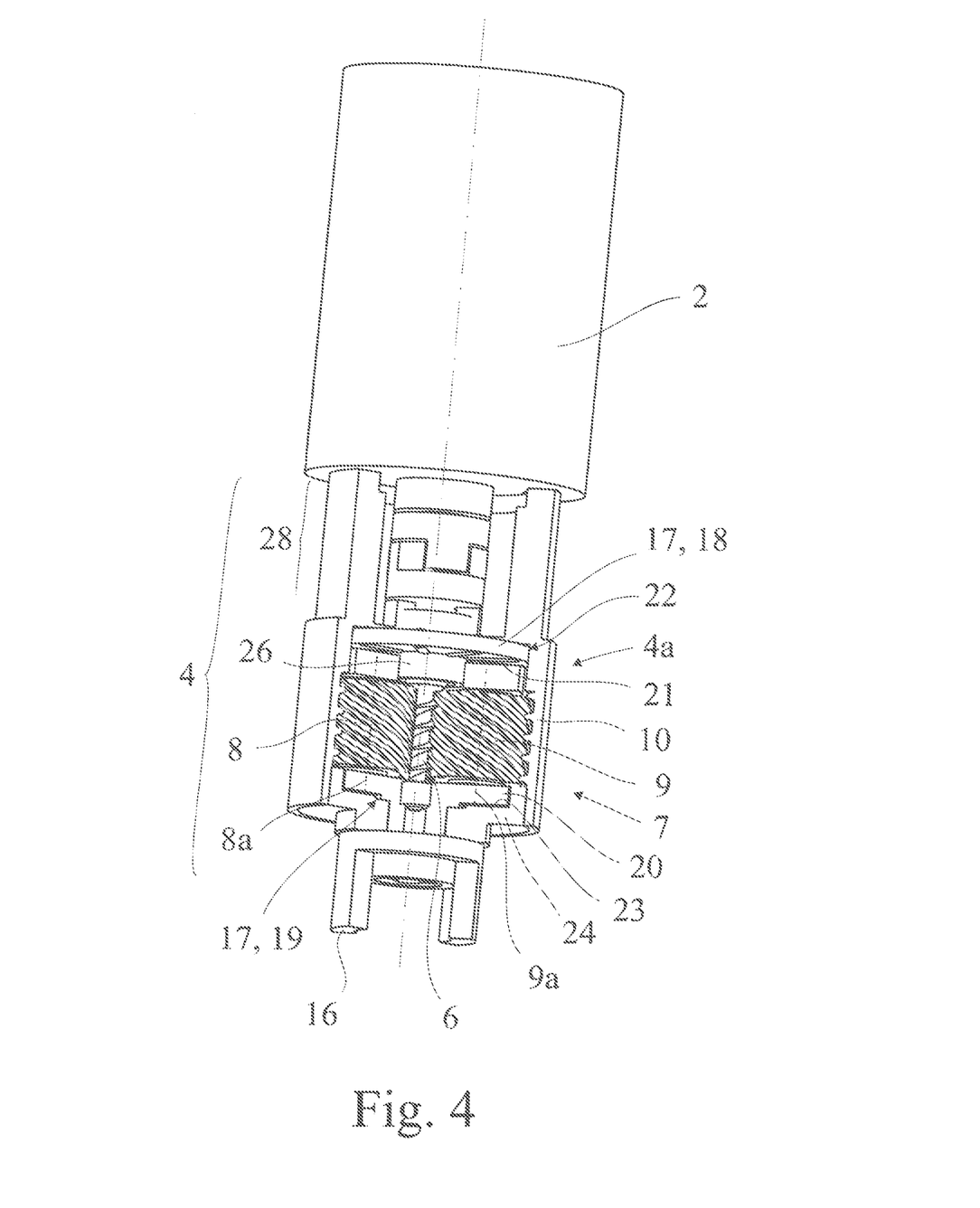
FIG. 4 shows the arrangement according to FIG. 3 in a perspective, partly sectional representation.

The basic functioning of the planetary gear mechanism 4a can be seen by viewing FIGS. 3 and 4 together. The sun gear 6 is set in rotation via the motor shaft 3 of the drive motor 2 and brings about a rotation of the planet gears 8, 9 about the respective planet gear axes 8a, 9a via the evoloid gearing. The rotation of the planet gears 8, 9 in turn brings about a rolling of the planet gears 8, 9 on the internal toothing of the ring gear 10, which results in a rotation of the planet-gear carrier 7 about the planet-gear carrier axis 7a. The rotation of the planet-gear carrier 7 is passed via the output 16 to the drive spindle 11, which brings about a linear adjustment of the spindle nut 12 along the drive spindle 11. The functioning of the feed gear mechanism 5 is explained in detail further below.

In the representation according to FIG. 3, it is noticeable that the diameter of the planet gears 8, 9 is greater than the diameter of the sun gear 6 by a factor that lies in a range between approximately 2 and approximately 4, in particular at approximately 3.

Viewing FIGS. 3 and 5 together shows that in an embodiment, two planet gears 8, 9 are provided, arranged when considered in a cross section taken transversely in relation to the longitudinal drive axis 14 on opposite sides of the sun gear 6. In an embodiment, the planet gear axes 8a, 9a lie in one plane, in which the sun gear axis 6a also lies.

In principle, it is also possible to provide more than two planet gears 8, 9, such as four planet gears, which are at least partly arranged offset, such as in pairs, with respect to the longitudinal drive axis 14. The offset of the planet gears is set in precisely such a way that a collision-free arrangement of the planet gears in relation to one another is ensured.

It has surprisingly been found that a non-self-locking design of the speed reduction gear mechanism 4, in particular that is of the planetary gear mechanism 4a, is quite possible with the proposed evoloid gearing. It is correspondingly provided that the speed reduction gear mechanism 4, such as even the entire drive train comprising the drive motor 2, the speed reduction gear mechanism 4 and the feed drive mechanism 5, is of a non-self-locking design. This is advantageous in particular when the spindle drive is used as a tailgate drive, so that a manual adjustment of the tailgate 1 is quite possible when no power is being supplied to the drive motor 2.

The proposed evoloid gearing ensures a great reduction with good efficiency. However, the transmission of drive torques always involves a certain axial force on the sun gear 6 on the one hand and on the planet-gear carrier 7 on the other hand. The planet-gear carrier 7 and/or the sun gear 6 should correspondingly be axially mounted, in particular if a non-self-locking arrangement is needed. Such axial mounting is at least partly realized in the case of the exemplary embodiment of the planet-gear carrier 7 and the sun gear 6 that is represented.

An axial bearing arrangement 17, which in the case of the exemplary embodiment that is represented and has an axial bearing 18 designed as a rolling bearing, is provided for the planet-gear carrier 7. The rolling bearing 18 is specifically a needle bearing with radially arranged bearing bodies. In principle, the axial bearing 18 may also be any kind of cylindrical roller bearing, ball bearing or the like. It is also conceivable that more than just one axial bearing 18 designed as a rolling bearing is provided.

In the case of the exemplary embodiment that is represented, an axial bearing arrangement 17 is provided for the planet-gear carrier 7, bearing the planet-gear carrier 7 in both axial directions. An interesting fact here is that the axial bearing arrangement 17 is asymmetrically designed, so that the bearing friction is different in opposing axial loading directions under axial loading of an identical amount. In an embodiment, the bearing friction in one axial direction is more than 10% over the bearing friction in the other axial direction.

The above asymmetry is obtained in the case of the exemplary embodiment that is represented by the axial bearing arrangement 17 for the planet-gear carrier 7 providing an aforementioned axial bearing 18 designed as a rolling bearing in one axial direction and providing an axial bearing 19 designed as a sliding bearing in the other axial direction.

In the case of the exemplary embodiment that is represented, the rolling bearing 18 and the sliding bearing 19 are realized in a structurally particularly simple form. The main reason for this is that the planet-gear carrier 7 has a substantially cylindrical carrier structure 20 for the planet gears 8, 9, which is aligned with the longitudinal drive axis 14. The substantially cylindrical form of the carrier structure 20 can be clearly seen in the representation according to FIG. 5. The substantially cylindrical carrier structure 20 of the planet-gear carrier 7 is correspondingly equipped with a cylinder end face 21, which here is in surface-area engagement with the rolling bearing 18 of the axial bearing arrangement 17. In this case, the rolling bearing 18, which as explained is designed as a needle bearing, is supported on a shoulder 22 that is fixed to the housing, as can be seen by viewing FIGS. 3 and 4 together.

The other cylinder end face 23 of the substantially cylindrical carrier structure 20 lies against a housing cover 24 in a sliding manner and thus forms the axial bearing 19 designed as a sliding bearing.

The sun gear 6 is also equipped with an axial bearing arrangement 25, which can be designed purely as a sliding bearing arrangement (FIG. 3). In principle, however, it is also conceivable that the axial bearing arrangement 25 for the sun gear 6 also has at least one axial bearing designed as a rolling bearing, in particular a cylindrical roller bearing, needle bearing or ball bearing.

The axial bearing arrangement 25 of the sun gear 6 may in principle bear the sun gear 6 in both axial directions and in particular be designed asymmetrically in the above way. In the case of such a design, the bearing friction is correspondingly different in opposing axial loading directions under axial loading of an identical amount. The bearing friction in one axial direction can be more than 10% over the bearing friction in the other axial direction.

In principle, it is also conceivable that the axial bearing arrangement 25 for the sun gear 6 provides an axial bearing designed as a rolling bearing in one axial direction and provides an axial bearing designed as a sliding bearing in the other axial direction.

As already explained, the axial bearing arrangement 25 for the sun gear 6 is purely a sliding bearing arrangement. For this, the sun gear 6 is assigned a bearing sleeve 26, which is supported on a shoulder 27 that is fixed to the housing, in particular is pressed into this shoulder 27 that is fixed to the housing. The bearing sleeve 26 provides both a radial bearing and an axial bearing in an axial direction, upwardly in FIG. 3. The axial mounting of the sun gear 6 in the other axial direction, downwardly in FIG. 3, can be obtained by the sun gear 6 being pressed by a claw 28a of a claw coupling 28, which comes to bear against a wall element 29 that is fixed to the housing when there is a movement of the sun gear 6 that is downwardly directed in FIG. 3.

It has already been explained that both the axial bearing arrangement 17 for the planet-gear carrier 7 and the axial bearing arrangement 25 for the sun gear 6 may be asymmetrically designed in such a way that the bearing friction is different in opposing axial loading directions under identical axial loading. This means that, under axial loading of an identical amount on the planet-gear carrier 7 and on the sun gear 6, a different bearing friction results, depending on the loading direction. This asymmetrical design may be particularly advantageous in terms of a low-cost design of the speed reduction gear mechanism 4 if the adjusting element 1 to be adjusted has a certain opening or closing tendency. This is generally the case when the spindle drive is used as a tailgate drive. An adjusting element 1 designed as a tailgate often has in any case a closing tendency in a certain adjusting range, which is opposed by the tailgate drive acting with a driving effect during opening and possibly acting with a retarding effect during closing. As a result, the sun gear 6 and the planet-gear carrier 7 are predominantly loaded in predetermined axial directions that are always opposing for these two components 6, 7. For such a case a particularly low bearing friction can be provided, in particular by use of a rolling bearing, only with regard to the predominantly occurring loading directions. The other direction respectively, the opening direction, may be designed at low cost with a sliding bearing.

Finally, attention may also be drawn to the functioning of the feed gear mechanism 5. As already explained, a rotation of the motor shaft 3 always brings about a speed-reduced rotation of the output 16 of the speed reduction gear mechanism 4, which is passed to the drive spindle 11. A rotation of the drive spindle 11 brings about a linear adjustment of the spindle nut 12, and consequently a linear adjustment of a guide tube 30, which is fixedly connected to the spindle nut 12. The guide tube 30 is in turn connected in the region of a connection 31 of the spindle drive to an outer tube 13a, which is telescopic with respect to an inner tube 13b. The outer tube 13a and the inner tube 13b together make up the drive housing 13 of the spindle drive. The inner tube 13b is connected to the other connection 32 of the spindle drive. It also receives the preassembled unit comprising the drive motor 2 and the speed reduction gear mechanism 4.

The structure represented in FIGS. 3, 4 and 5 is the reason that the drive motor 2 and the speed reduction gear mechanism 4 can be preassembled. These representations reveal that the speed reduction gear mechanism 4 is assigned a gear housing 33, which can be mounted on the drive motor 2 in the course of a preassembly and is fixedly connected to the inner tube 13b of the drive housing 13.

Figure 1:
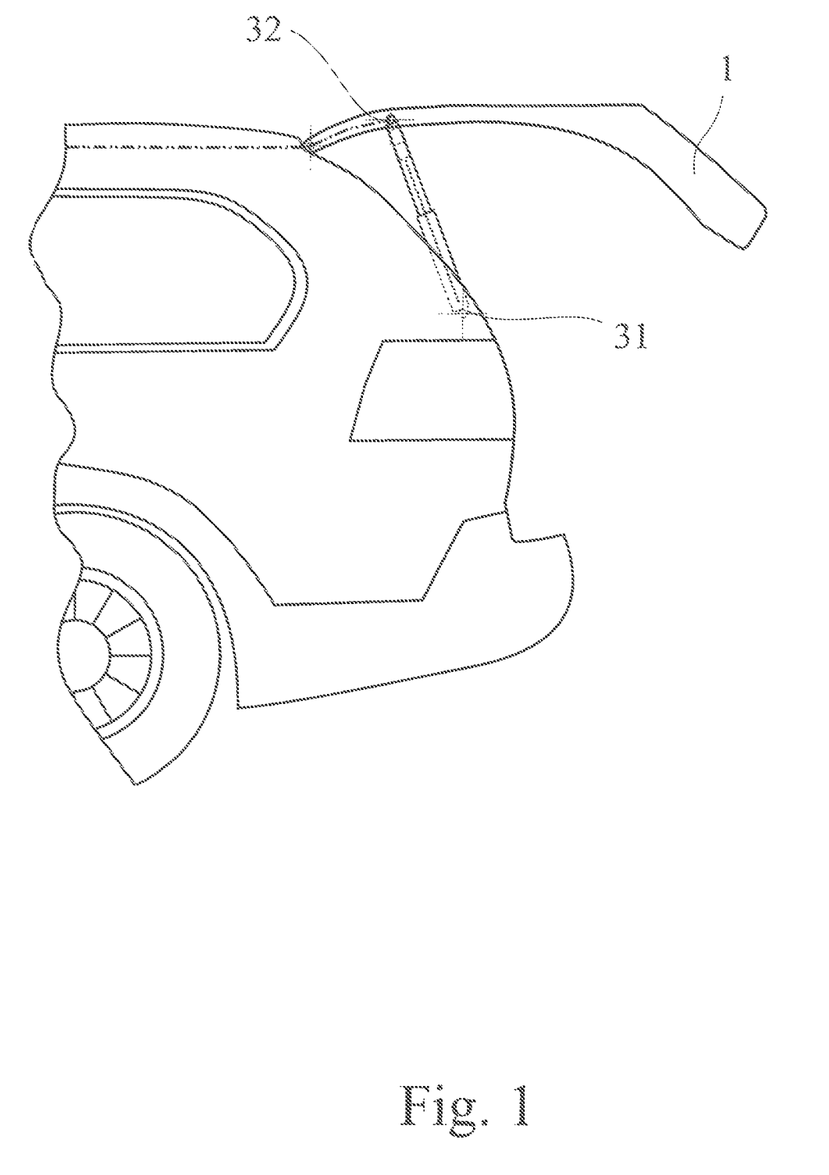
FIG. 1 shows in an entirely schematic representation the tailgate region of a motor vehicle with a proposed spindle drive.
Figure 2:
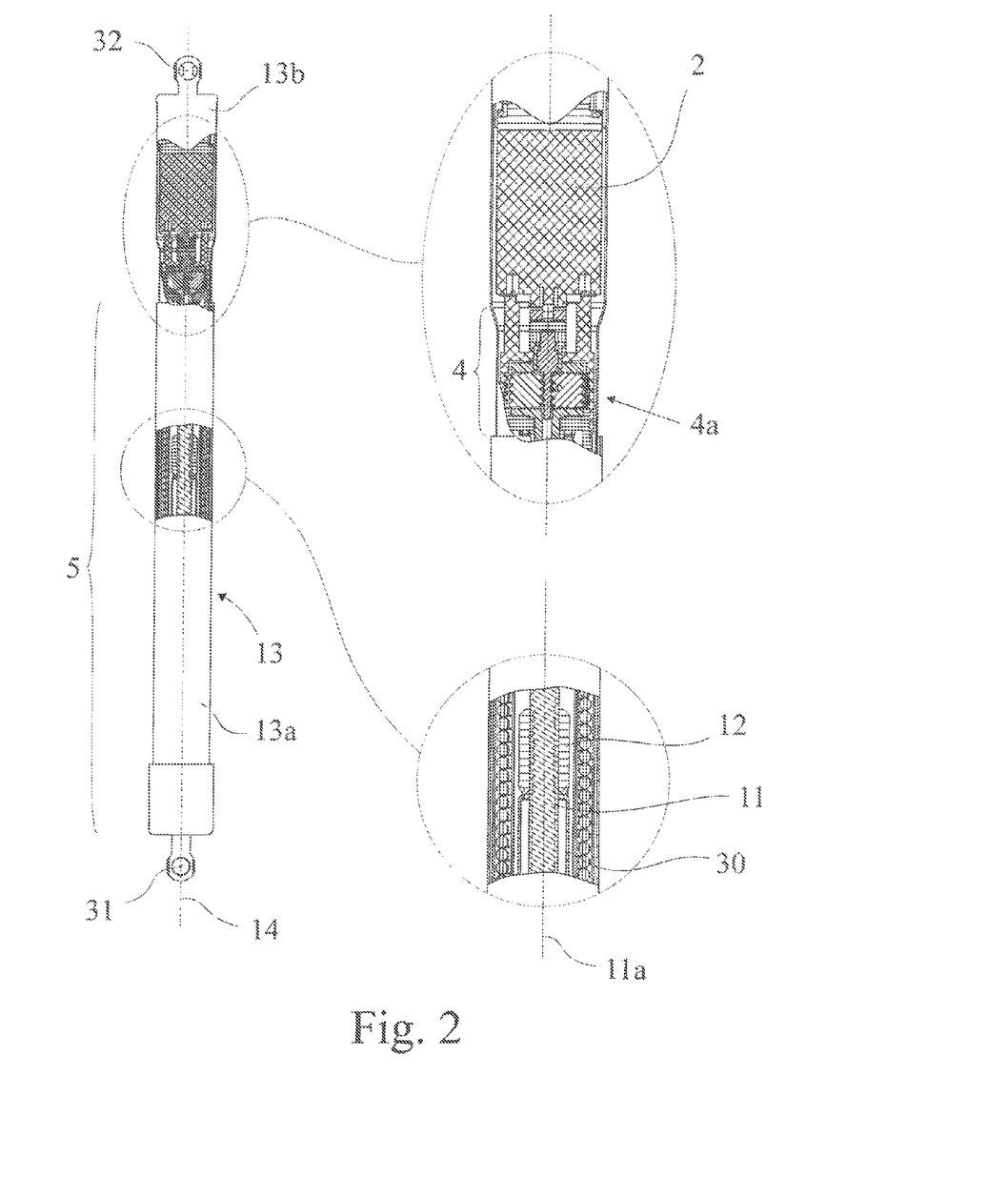
FIG. 2 shows the spindle drive according to FIG. 1 in a partially sectional side view.
Figure 6:
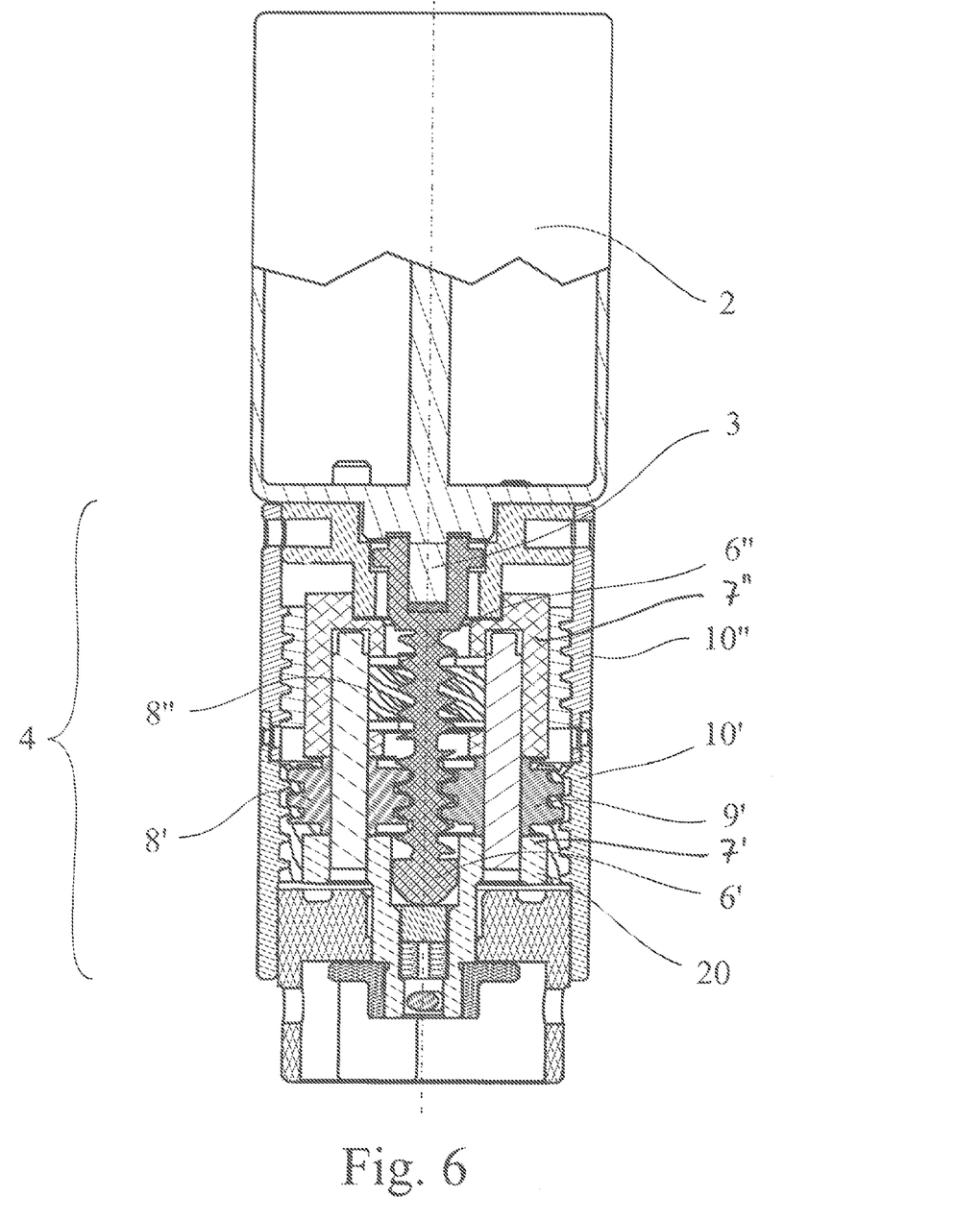
FIG. 6 shows the drive motor with a downstream speed reduction gear mechanism for a spindle drive according to FIG. 2 in a further embodiment in a longitudinal section.
Figure 7:
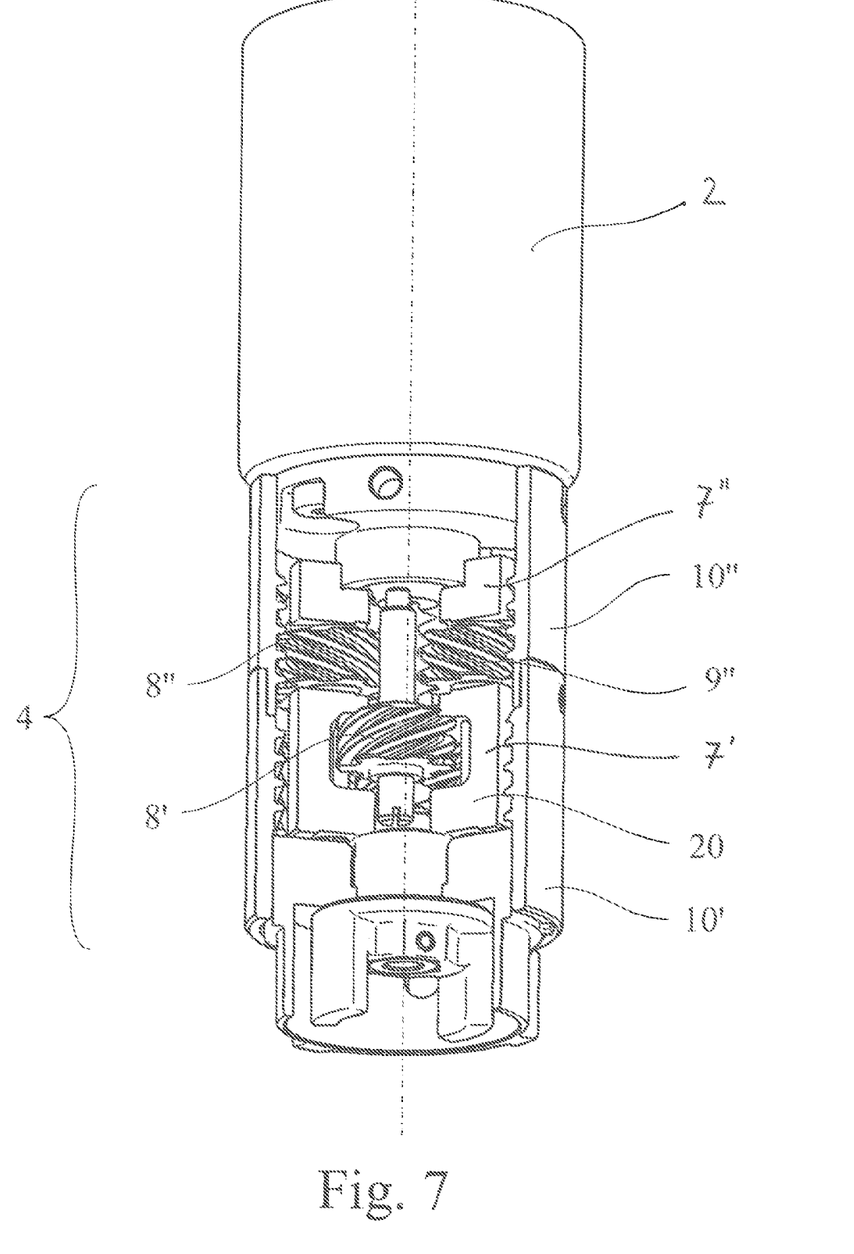
FIG. 7 shows the arrangement according to FIG. 6 in a perspective, partly sectional representation
Figure 8:
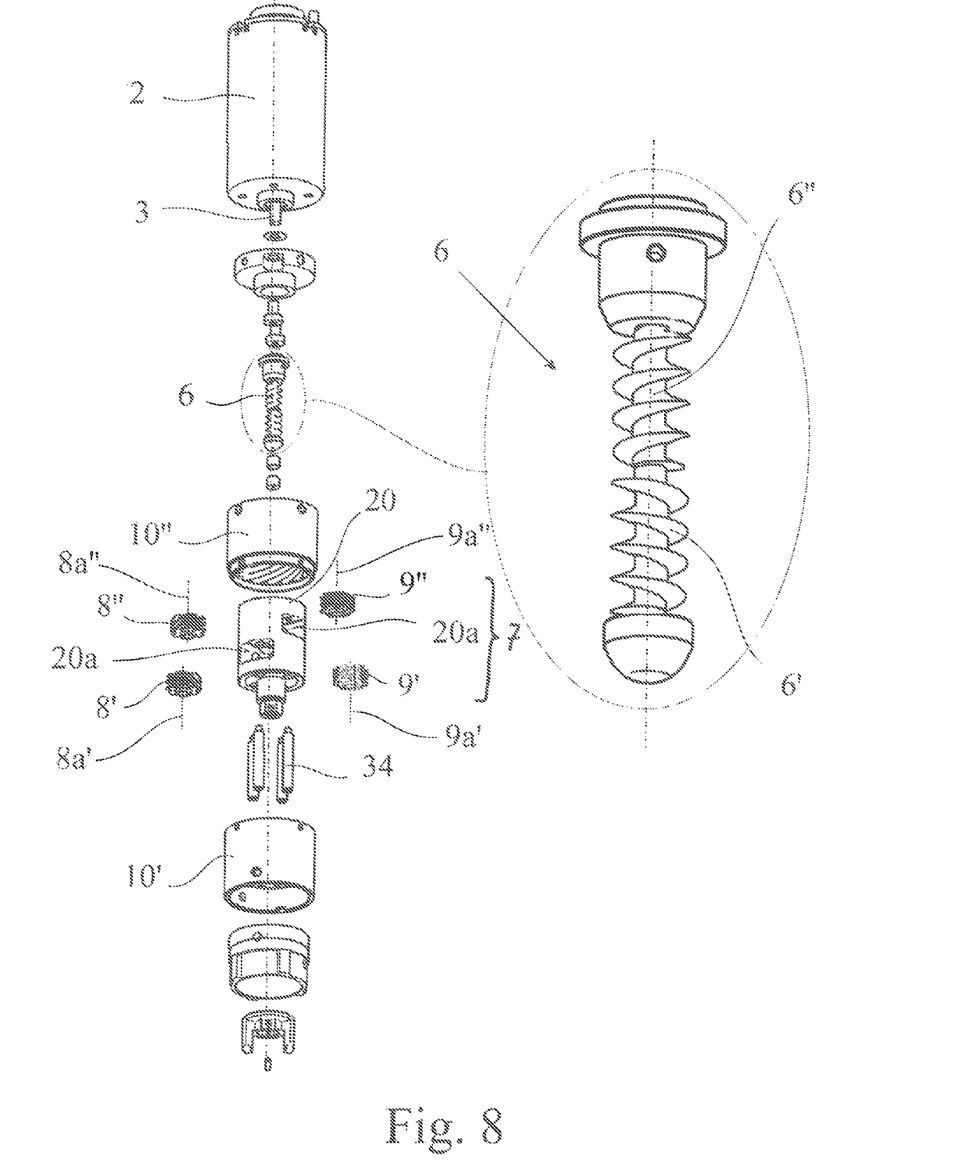
FIG. 8 shows the arrangement according to FIG. 6 in an exploded representation.

FIGS. 6 to 8 show a drive motor 2 with a downstream speed reduction gear mechanism 4 in a further embodiment, suitable for a proposed spindle drive according to FIG. 2 instead of a drive motor 2 there with a downstream speed reduction gear mechanism 4 according to FIG. 3. A proposed spindle drive with such a drive motor 2 with a downstream reduction gear mechanism is explained below. With this embodiment, the resultant axial loading of the sun gear 6, that is the loading of the sun gear 6 along the sun gear axis 6a, can be reduced or even avoided completely. The important fact in this respect is that the sun gear 6 has a first sun gear portion 6' and a second sun gear portion 6", the sun gear portions 6', 6" arranged axially one behind the other, in particular directly axially one behind the other. It can best be seen from the representation according to FIG. 6 that the two sun gear portions 6', 6" are connected to one another in one piece.

The representation of a detail according to FIG. 8 shows that the two sun gear portions 6', 6" have opposing flank directions. This is the basic prerequisite for the axial forces of the planet gears 8', 9' and 8", 9" to be able to cancel one another out. It is correspondingly provided that the planet-gear carrier 7 has at least one planet gear of the first type 8', 9', two planet gears of the first type 8', 9', and at least one planet gear of the second type 8", 9", two planet gears of the second type 8", 9". In an embodiment, it is the case that the at least one planet gear of the first type 8', 9' and the at least one planet gear of the second type 8", 9" have opposing flank directions. The planet gears of the first type 8', 9' and planet gears of the second type 8", 9" that are represented are arranged axially offset in relation to one another, so that they are correspondingly in engagement with the first sun gear portion 6' and the second sun gear portion 6". For this, the planet-gear carrier 7 has a first planet-gear carrier portion 7', for receiving the at least one planet gear of the first type 8', 9', and a second planet-gear carrier portion 7", for receiving the at least one planet gear of the second type 8", 9". The two planet-gear carrier portions 7' and 7" are arranged axially one behind the other, in particular directly one behind the other.

In the case of the exemplary embodiment that is represented in FIGS. 6 to 8, the planet-gear carrier 7 again has a substantially cylindrical carrier structure 20, which is aligned with the longitudinal drive axis 14. The cylindrical carrier structure 20 is equipped with pockets 20a, in which the planet gears 8', 9', 8", 9" are arranged. The planet gears 8', 9', 8", 9" are rotatably mounted on pins 34.

As can be seen from the representation according to FIG. 8, the cylindrical carrier structure 20 is a one-piece component.

In a way corresponding to the design of the sun gear 6 and planet gears 8', 9', 8", 9" explained above, differing from portion to portion, the ring gear 10 also has a first ring gear portion 10' and a second ring gear portion 10", the two ring gear portions 10', 10" being arranged axially one behind the other, even directly axially one behind the other. A notable fact here is that the first ring gear portion 10' and the second ring gear portion 10" have opposing flank directions. In this case, the first ring gear portion 10' and the second ring gear portion 10" are designed as separate components, in particular as separately mountable components. This can best be seen from the representation according to FIG. 8. On account of the different flank directions of the two ring gear portions 10', 10" and the associated planet gears 8', 9' and 8", 9", mounting of the ring gear 10 can be implemented best with such a two-part structure of the ring gear 10. Also in the case of the exemplary embodiment that is represented in FIGS. 6 to 8, the arrangement is set up in such a way that the engagement between the sun gear 6 and the at least one planet gear 8', 9', 8", 9" of the planet-gear carrier 7 is designed as an evoloid gearing. Reference may be made in this respect to all of the statements made in relation to the first-mentioned exemplary embodiment.

Specifically, the at least one planet gear of the first type 8', 9' is in axially parallel engagement with the first sun gear portion 6' on the one hand and the first ring gear portion 10' on the other hand, while the at least one planet gear of the second type 8', 9' is in axially parallel engagement with the second sun gear portion 6" on the one hand and the second ring gear portion 10" on the other hand.

In the case of the exemplary embodiment that is represented in FIGS. 6 to 8, the configuration is also set up in such a way that, during operation under load, here during the driving of the sun gear 6, the at least one planet gear of the first type 8', 9' and the at least one planet gear of the second type 8", 9" exert axial forces, such as forces of the same amount, on the sun gear 6 in opposing axial directions. Depending on the direction of rotation, these axial forces act toward one another or away from one another. In an embodiment, these axial forces cancel one another out, so that resulting frictional forces can be reduced and the efficiency can be increased.

In the case of the embodiment that is represented in FIGS. 6 to 8, it is in turn the case that, during operation under load, here during the driving of the sun gear 6, the at least one planet gear of the first type 8', 9' and the at least one planet gear of the second type 8", 9" always rotate in the same direction.

The geometrical arrangement of the planet gears 8', 9', 8", 9" is of special significance in the present case. In an embodiment, it is the case that two planet gears of the first type 8', 9' are provided, arranged when considered in a cross section taken transversely in relation to the longitudinal drive axis 14 on opposite sides of the sun gear 6, while alternatively or additionally two planet gears of the second type 8', 9' are provided, arranged when considered in a cross section taken transversely in relation to the longitudinal drive axis 14 on opposite sides of the sun gear 6. In an embodiment, it is thus the case that when considered in a cross section taken transversely in relation to the longitudinal drive axis 14 the planet gear axes 8a', 9a' of the planet gears of the first type 8', 9' lie in a first plane and the planet gear axes 8a", 9a" of the planet gears of the second type 8", 9" lie in a second plane, which is aligned perpendicularly to the first plane. As a result, operation with particularly little vibration can be realized.

It can be summarized that, with the second exemplary embodiment that is represented in FIGS. 6 to 8, optimum force conditions can be set, whereby a resultant loading on the sun gear 6 can be reduced or even avoided completely by the engagement with the planet gears 8', 9', 8", 9". Otherwise, this exemplary embodiment corresponds to the exemplary embodiment represented in FIGS. 3 to 5 in terms of the basic evoloid concept, so that, for advantages and variants, reference may be made to the statements made in relation thereto.

According to a further teaching, which is likewise of independent significance, an adjusting element arrangement of a motor vehicle with an adjusting element 1 and a spindle drive as proposed above for the motorized adjustment of the adjusting element 1 is claimed. Reference may be made to all of the statements made in relation to the proposed spindle drive that are suitable for explaining the adjusting element arrangement.

As explained above, numerous variants are conceivable for the adjusting element 1. In an embodiment, the adjusting element 1 is a tailgate, a trunk lid, a door, in particular a side door, an engine hood or the like of a motor vehicle.

The invention claimed is:

1. A spindle drive for the motorized adjustment of an adjusting element of a motor vehicle, comprising a drive motor with a motor shaft, a speed reduction gear mechanism, arranged downstream of the drive motor, and a feed gear mechanism, arranged downstream of the speed reduction gear mechanism, the speed reduction gear mechanism having a planetary gear mechanism and the feed gear mechanism being designed as a spindle/spindle nut gear mechanism, the planetary gear mechanism having a rotatable sun gear and coaxially in relation thereto a rotatable planet-gear carrier and a fixed or fixable ring gear, and the planet-gear carrier carrying at least one rotatable planet gear, which is in axially parallel engagement with the sun gear on the one hand and the ring gear on the other hand, the drive motor, the speed reduction gear mechanism and the feed gear mechanism being accommodated one behind the other in a substantially elongate drive housing and aligned with a common longitudinal drive axis, wherein the engagement between the sun gear and the at least one planet gear of the planet-gear carrier is designed as an evoloid gearing, wherein the sun gear comprises helical toothing, wherein the helical toothing comprises a pinion tooth that extends around an axis of the sun gear at least once.

2. The spindle drive as claimed in claim 1, wherein the sun gear forms the driving end and the planet-gear carrier forms the driven end of the planetary gear mechanism.

3. The spindle drive as claimed in claim 1, wherein the planetary gear mechanism provides a speed reduction which lies in a range between approximately 17:1 and approximately 19:1, or in that the planetary gear mechanism provides a speed reduction which lies in a range between approximately 14:1 and 17:1.

4. The spindle drive as claimed in claim 1, wherein the speed reduction gear mechanism is of a single-stage design and provides the single gear mechanism stage between the drive motor and the feed gear mechanism.

5. The spindle drive as claimed in claim 1, wherein the sun gear is designed as an evoloid gear wheel; and wherein the pinion tooth is a single pinion tooth, or wherein the pinion tooth is one of two pinion teeth, or wherein the pinion tooth is one of three pinion teeth.

6. The spindle drive as claimed in claim 1, wherein the at least one planet gear assigned to the planet-gear carrier is designed as a helical-toothed cylindrical gear.

7. The spindle drive as claimed in claim 1, wherein the ring gear has for the engagement with the at least one planet gear assigned to the planet-gear carrier, a helical internal toothing.

8. The spindle drive as claimed in claim 1, wherein the diameter of the at least one planet gear is greater than the diameter of the sun gear by a factor that lies in a range between approximately 2 and approximately 4.

9. The spindle drive as claimed in claim 1, wherein two planet gears are provided, arranged when considered in a cross section taken transversely in relation to the longitudinal drive axis on opposite sides of the sun gear.

10. The spindle drive as claimed in claim 1, wherein more than two planet gears, which are at least partly arranged offset, with respect to the longitudinal drive axis, are provided.

11. The spindle drive as claimed in claim 1, wherein the speed reduction gear mechanism, the drive train comprising the drive motor, the speed reduction gear mechanism and the feed gear mechanism, is of a non-self-locking design.

12. The spindle drive as claimed in claim 1, wherein an axial bearing arrangement is provided for the planet-gear carrier.

13. The spindle drive as claimed in claim 1, wherein an axial bearing arrangement is provided for the planet-gear carrier, bearing the planet-gear carrier in both axial directions.

14. The spindle drive as claimed in claim 13, wherein the axial bearing arrangement for the planet-gear carrier provides an axial bearing designed as a rolling bearing in one axial direction and provides an axial bearing designed as a sliding bearing in the other axial direction.

15. The spindle drive as claimed in claim 1, wherein the planet-gear carrier has a substantially cylindrical carrier structure for the at least one planet gear, which is aligned with the longitudinal drive axis.

16. The spindle drive as claimed in claim 1, wherein an axial bearing arrangement is provided for the sun gear.

17. The spindle drive as claimed in claim 1, wherein an axial bearing arrangement is provided for the sun gear, bearing the sun gear in both axial directions.

18. The spindle drive as claimed in claim 16, wherein the axial bearing arrangement for the sun gear provides an axial bearing designed as a rolling bearing in one axial direction and provides an axial bearing designed as a sliding bearing in the other axial direction.

19. The spindle drive as claimed in claim 1, wherein the speed reduction gear mechanism is assigned a gear housing, which can be mounted on the drive motor in the course of a preassembly.

20. The spindle drive as claimed in claim 1, wherein the sun gear has a first sun gear portion and a second sun gear portion.

21. The spindle drive as claimed in claim 20, wherein the two sun gear portions have opposing flank directions.

22. The spindle drive as claimed in claim 20, wherein the planet-gear carrier has at least one planet gear of the first type and at least one planet gear of the second type.

23. The spindle drive as claimed in claim 22, wherein the at least one planet gear of the first type and the at least one planet gear of the second type have opposing flank directions.

24. The spindle drive as claimed in claim 20, wherein the planet-gear carrier has a first planet-gear carrier portion, for receiving the at least one planet gear of the first type, and a second planet-gear carrier portion, for receiving the at least one planet gear of the second type.

25. The spindle drive as claimed in claim 20, wherein the ring gear has a first ring gear portion and a second ring gear portion.

26. The spindle drive as claimed in claim 20, wherein the first ring gear portion and the second ring gear portion have opposing flank directions.

27. The spindle drive as claimed in claim 20, wherein the first ring gear portion and the second ring gear portion are designed as separate components.

28. The spindle drive as claimed in claim 20, wherein the at least one planet gear of the first type is in axially parallel engagement with the first sun gear portion on the one hand and the first ring gear portion on the other hand and in that the at least one planet gear of the second type is in axially parallel engagement with the second sun gear portion on the one hand and the second ring gear portion on the other hand.

29. The spindle drive as claimed in claim 20, wherein, during operation under load, the at least one planet gear of the first type and the at least one planet gear of the second type exert axial forces on the sun gear in opposing axial directions, and/or in that the at least one planet gear of the first type and the at least one planet gear of the second type always rotate in the same direction during the driving of the sun gear.

30. The spindle drive as claimed in claim 20, wherein two planet gears of the first type are provided, arranged when considered in a cross section taken transversely in relation to the longitudinal drive axis on opposite sides of the sun gear, and/or in that two planet gears of the second type are provided, arranged when considered in a cross section taken transversely in relation to the longitudinal drive axis on opposite sides of the sun gear.

31. An adjusting element arrangement of a motor vehicle with an adjusting element and a spindle drive for the motorized adjustment of the adjusting element as claimed in claim 1.

32. The adjusting element arrangement as claimed in claim 31, wherein the adjusting element is a tailgate, a trunk lid, a door, an engine hood or the like, of a motor vehicle.

* * * * *